July 14, 1953   J. G. VINCENT   2,645,299
TRANSMISSION FOR MOTOR VEHICLES
Filed Jan. 11, 1949   2 Sheets-Sheet 1

Inventor
Jesse G. Vincent
By
Watson, Cole, Grindle & Watson
ATTORNEY

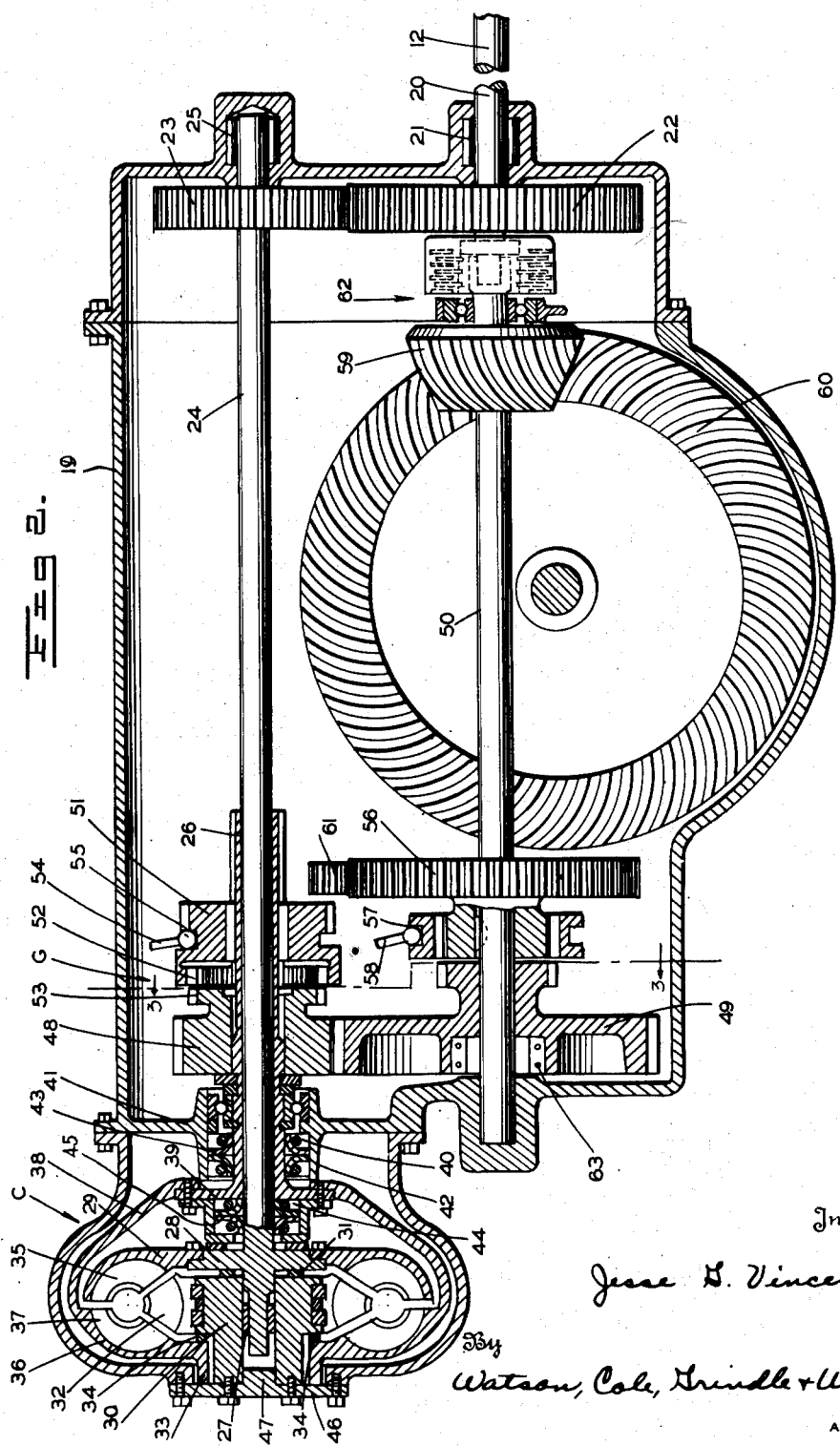

Patented July 14, 1953

2,645,299

UNITED STATES PATENT OFFICE 2,645,299

TRANSMISSION FOR MOTOR VEHICLES

Jesse G. Vincent, Detroit, Mich., assignor to Packard Motor Car Company, Detroit, Mich., a corporation of Michigan Application January 11, 1949, Serial No. 70,281

5 Claims. (Cl. 180—70)

This invention relates to power transmission systems for motor vehicles. It is particularly concerned with a power transmission system in which the transmission mechanism comprises a fluid torque converter and in which the fluid torque converter and any associated change speed gearing are disposed immediately adjacent and preferably rearwardly of the rear wheel driving axles.

The currently dominant design of motor vehicle propulsion mechanism is such as to require the positioning of a large part of the propulsion mechanism and the auxiliaries generally associated with it, on the forward section of the automobile frame. As a result the front wheel assembly of the automobile bears a disproportionate part of the total weight of such mechanism. The front wheel assembly must, therefore, be characterized by strength, and consequently, by additional weight, which is greater than that which would be required in a design which more closely approximates the optimum in which each ground wheel carries an equal proportion of the total weight of the vehicle.

An improved distribution of vehicle weight on the ground wheels would result further in equalizing the rate of wear between the front and rear wheel tires and permit the use of a lighter construction in the steering assembly without sacrificing strength factors. The problem of redistributing the propulsion mechanism mass on the frame has been acknowledged but generally dealt with on the basis that it can only be satisfactorily met by positioning the engine on the rearward section of the frame. This alteration, however, requires an unorthodox body styling and to a large degree the desirability of equal loading of the ground wheels remains subservient to the practical necessity of observing existing standards of body design.

This invention proposes a novel arrangement of the elements of a power transmission comprising a fluid torque converter and change speed gearing in which the converter and gearing are supported in close relationship to the driving rear axles in such manner as to materially aid in equalizing the wheel loads and which is distinguished by its compactness, accessibility, and efficiency. All of the aforementioned advantages are obtained without departure from the currently accepted style or design of vehicle body.

An important feature of this invention is the arrangement in a housing of a power transmission unit and the disposition of the housing, at least in large part, to the rear of the rear axle of the vehicle on elastic mountings, or on brackets secured directly to the vehicle frame. In utilizing this arrangement power is transmitted from the main propeller shaft, which extends rearwardly from the forwardly mounted vehicle engine to the rear axles, to a stub shaft supported in the transmission unit housing. A countershaft which is operably connected with the impeller segment of the fluid converter is also supported within the housing above the driving shaft and is driven by the coaction of gears secured on the forward ends of the stub shaft and the countershaft. One cluster of the change speed gearing is carried on a countershaft sleeve which is concentric with and surrounds the countershaft and which is driven by the runner segments of the fluid converter. The cluster of the change speed gearing is positioned on the countershaft sleeve to the rearward of the rear axle. The fluid converter is supported on the countershaft rearward of the change speed gearing and drives the axle driving shaft through an overrunning clutch which is designed to permit the power to be delivered to the ground wheels directly from the engine when a unitary drive from the stub shaft has been established through a direct drive clutch to the axle driving shaft thus cutting out the fluid converter when direct drive from the engine is selected. The cluster of change speed gearing carried on the axle driving shaft for selective driving engagement with the gearing on the countershaft sleeve is also positioned rearward of the rear axle.

This construction and general arrangement is attended with advantages other than more equal distribution of the weight carried by the ground wheels; for example, this makes it possible to keep the converter oil and the rear axle oil wholly separate and to provide a separate seal for each oil body. The proposed construction is particularly adapted for use with independently sprung rear wheels used in conjunction with swinging axles.

In the drawings:

Figure 2 is an axial vertical section through the change speed gearing unit of the power transmission;

Figure 1:
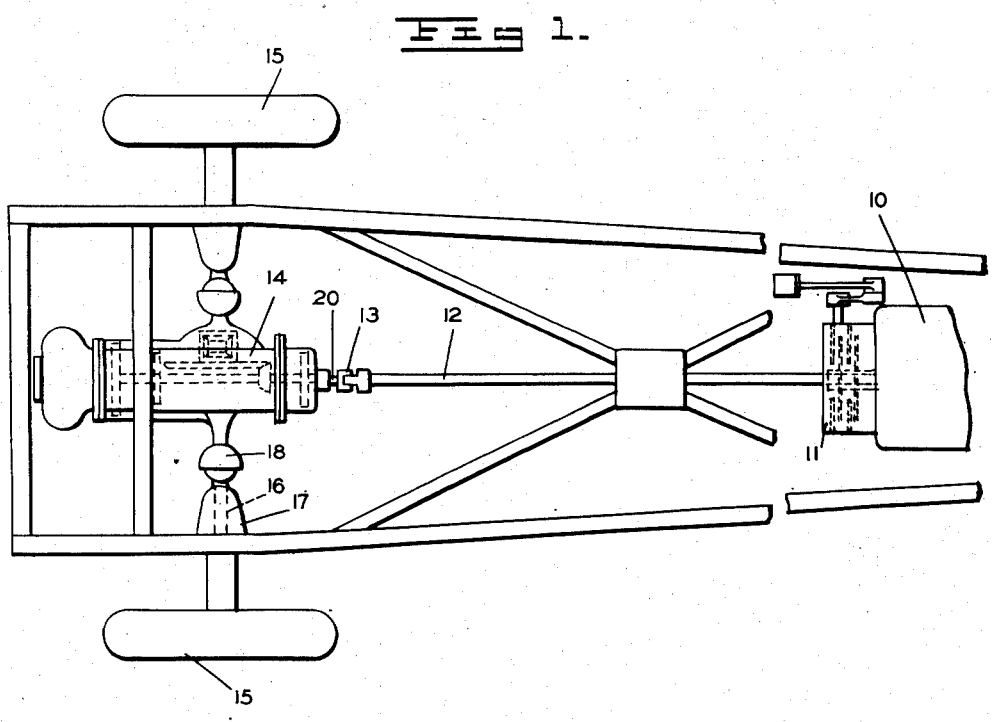
Figure 1 is a plan view of the frame of a motor vehicle upon which is mounted a power transmission mechanism embodying the present invention.
Figure 3:
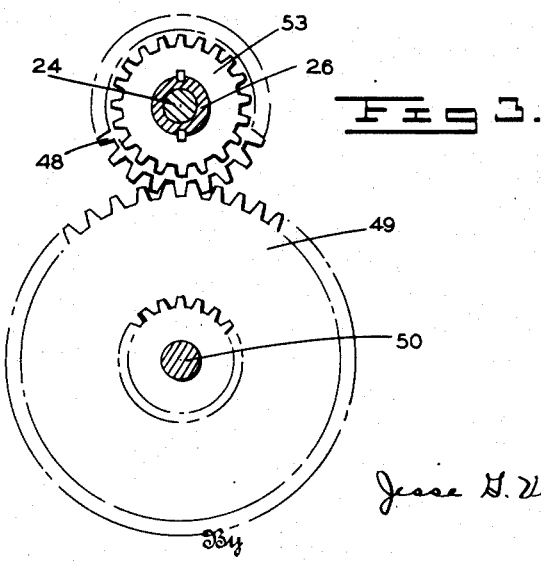
Figure 3 is a cross-section on the line 3—3 of Figure 2.

In the embodiment of the invention illustrated the engine 10 is supported on the forward section of the frame and the torque developed by the engine is transmitted through the clutch 11, the main propeller shaft 12 and the universal joint 13, to the transmission unit 14. The rear wheels 15 are supported on and driven by the rear axles 16 which are encased in the housings 17. The rear axle 16 and rear axle housings 17 are provided with universal joints, respectively, of known type, which permit the outer ends of the axle and axle housing to move relatively to the inner ends thereof, the universal joint in the housing being indicated at 18. The universal joint in the shaft is concealed by the housing in Figure 1.

A transmission unit comprising a fluid torque converter C and change speed gearing C is enclosed in the housing 19 which housing may be resiliently supported on the body of the motor vehicle or on brackets which are secured directly to the automobile frame. The main propeller shaft 12 is operatively connected to a stub shaft 20 which is journalled in the bearing 21, and upon which shaft is fixed the gear 22. The teeth of gear 22 mesh with those of a gear 23 which is keyed on the countershaft 24 which is journalled in the bearing 25, the countershaft sleeve 26, and the bushing 27. A circular flange 28 formed on the countershaft 24 towards the rearward end thereof engages the inner circumferential edge of the annular plate 29 which comprises the back wall of the impeller segment 35 of the fluid torque converter. The plate 29 is affixed to the flange 28 by means of bolts, studs, welds or other suitable fastening means and is thus caused to rotate in unison with the countershaft.

The rearward end of the countershaft 24 is journalled in the friction bushing 27 which is positioned in the central bore of the annular hub 30 this hub being fitted over the rearward end of the countershaft so that the forward vertical face of the hub abuts the bearing ring 31 interposed between the hub and the flange 28. The reaction segment 32 of the fluid converter is supported on the forward portion of the hub and the sleeve portion 33 of the driven segment of the converter is rotatably supported on the rear portion of the hub which is of reduced diameter. A bearing ring 34 is interposed between the driven element and the rearwardly facing shoulder formed on the hub by the reduction in diameter between the forward and rear portion thereof.

The back wall 36 of the driven segment 37 of the converter is provided with an extension 38 which envelops the impeller segment of the converter and which engages the flanged member 39 formed on the rearward end of the cylindrical countershaft sleeve 26.

The countershaft sleeve 26 is concentric with and mounted upon the countershaft 24 and extends through the stuffing box 40 constituted by the partition 41 and the upstanding circular flange 42 formed on the partition adjacent the central aperture thereof. The partition 41, in conjunction with the packing 43 retained by the stuffing box in sealing contact with the sleeve 26 and the partition flange 42, serves to maintain the converter oil separate from the gearing lubricant and thereby preserves the distinctive lubricating characteristics initially present in the separate oil bodies. A similar oil sealing member comprises the stuffing box 44 secured to the extension 38 of the driven element of the converter, and the packing 45 encased in the stuffing box prevents leakage of oil along the countershaft 24.

A circular cover plate 46 provided with a central boss 47 adapted to fit into and close the rearward end of the central bore of the hub 30 is secured to the housing and to the hub by two sets of fastening means spaced radially on the plate to engage the hub and the housing respectively.

A low speed gear 48 which forms a part of the change speed gearing cluster carried by the countershaft sleeve, is freely rotatably supported on the sleeve and meshes with the coacting gear 49 which is operatively connected with the rearward portion of the driving shaft 50, by means of the overrunning clutch indicated diagrammatically at 63. A sliding reversing gear 51 splined to the sleeve 26 and disposed for axial movement thereon is provided with an annular flange having internal teeth 52 adapted to engage the ring gear 53, formed on the forward end of the low speed gear 48, when the reversing gear is shifted rearwardly on the sleeve by means of the shifting fork 54 operating in the shifting collar 55, thereby clutching the low speed gear 48 to the sleeve 26.

The gear 56 is splined to the driving shaft 50 and arranged to be engaged with the gear 49 by means of the shifting collar 57 and fork 58 at the rearward limit of the axial movement of the collar 57. Positive geared drive of the axle driving shaft is thus obtained by shifting the gear 51 rearwardly into engagement with the gear 48 in which position the torque delivered to the sleeve 26 by the converter will be transmitted through the gear train consisting of the gears 51, 48, 49 and the overrunning clutch 63 to the driving axle 50, or by drive through the gears 51, 48, 49 and 57 to the gear 56 and thence to the axle driving shaft 50. A two way drive for use as hill descent gearing is thereby provided. A bevel gear 59 which meshes with the ring gear 60 of a differential is affixed to the axle driving shaft 50 and completes the driving connection between the differential and the fluid torque converter.

Reverse rotation of the axle driving shaft is obtained by shifting the gear 51 to the forward limit of its axial movement on the sleeve 26, in which position the gears 51 and 56 are in mesh with the reversing pinion 61 and disengaged from the gears 48 and 49, respectively.

The rotation of the sleeve 26 and reversing gear 51 is thus imparted in reverse direction to the gear 56 and thus to the axle driving shaft 50 by means of the drive through reversing pinion 61.

The clutch 11 is provided to free the propeller shaft 12 from the engine in order to prevent the gears 51 and 57 from clashing during their engaging movement or locking up after they have been engaged. The power necessary to operate the clutch 11 may be supplied by any well known hydraulic or vacuum means, and the clutch control means may be integrated with the gear shifting device so that the clutch operation is made responsive automatically to the initial movement of the gear shifting device.

Direct drive from the engine is accomplished by means of the clutch 62 which may be operated to complete a driving connection between the stub shaft 20 and the axle driving shaft 50. The overrunning clutch 63, shown as a sprag clutch, permits the axle driving shaft to rotate at a higher speed when engine torque is transmitted directly to the axle driving shaft through the direct drive clutch than that at which the axle driving shaft would be impelled by the low speed gear train consisting of gears 51, 48 and 49 which remain in constant mesh when the axle driving shaft is being rotated in the forward direction.

It will be seen from the foregoing description that the suggested construction disposes substantially all of the components of the transmission unit, particularly the fluid torque converter and change speed gearing, to the rear of the rear axle and thereby tends to equalize the weight load between the front and rear ground wheels.

The limited space which exists between the ordinary rear axle and the floor boards of a motor vehicle would not ordinarily accommodate the suggested construction without recessing the overlying floor boards to increase the space available immediately above the axle. For the most part, this objection may be obviated by using the suggested construction of the power transmission in conjunction with swiveling axles and independently suspended rear wheels which arrangement would permit partially interposing the transmission unit between the axles thus reducing the overall height of the axle and the associated transmission unit. The parallelogram type of wheel suspension utilizing coil springs combined with Cardan joint axles would be particularly suitable for use with the described power transmission mechanism.

It is apparent that various equivalent constructions and modifications of the oil partition and sealing means may be employed to effect complete separation of the converter oil from the rear axle oil when the fluid converter and the associated transmission gearing are arranged relatively in the manner described.

It will be appreciated that the suggested construction may comprise various types and designs of fluid torque converters, transmission gearing, and means of independently supporting the rear wheels, and that the references made to the embodiment of the invention illustrated in the drawings, and described in specific language in order to facilitate understanding of the invention, are not intended to exclude from the scope of the invention the alterations and modifications which would occur to one skilled in this art.

Having thus described the invention, what is claimed as new and desired to be secured by Letters Patent is:

1. A transmission assembly adapted for operative association with the driving axle installation of a motor vehicle to provide improved balance and weight distribution and which is accordingly substantially symmetrical transversely of the vehicle, said assembly comprising, in combination, a supporting frame through which the drive axle passes transversely; an axle driving shaft rotatably mounted in said frame, extending longitudinally thereof substantially in its vertical central longitudinal plane, and geared to said drive axle; a countershaft rotatably supported in the frame, extending parallel with said axle driving shaft, and lying substantially in said vertical central longitudinal plane; power means operatively connected with said countershaft; a rotary fluid torque converter having impeller and driven elements and disposed upon one side of said drive axle, the axis of said torque converter being substantially horizontally disposed and also lying substantially in said vertical central longitudinal plane; means affording a driving connection between said countershaft and the impeller element of said torque converter; a sleeve rotatably mounted on said countershaft and operatively connected with the driven element of the torque converter; and engageable and disengageable transmission gearing on said sleeve and said axle driving shaft, said gearing being located between said torque converter and said axle, longitudinally considered.

2. The transmission assembly as set forth in claim 1 in which an auxiliary housing is provided for the fluid torque converter, and a main housing is provided for the gearing and shafting, and a liquid-tight sealing means is provided between the two housings whereby the converter fluid may be maintained separate from the gearing lubricant.

3. A transmission assembly adapted for operative association with the driving axle installation of a motor vehicle to provide improved balance and weight distribution and which is accordingly substantially symmetrical transversely of the vehicle, said assembly comprising, in combination, a supporting frame through which the drive axle passes transversely; an axle driving shaft rotatably mounted in said frame, extending longitudinally thereof substantially in its vertical central longitudinal plane, and geared to said drive axle; a countershaft rotatably supported in the frame, extending parallel with said axle driving shaft, and lying substantially in said vertical central longitudinal plane; power means operatively connected with said countershaft, and disposed at one side of said drive axle, longitudinally considered; a rotary fluid torque converter having impeller and driven elements and disposed upon the opposite side of said drive axle, the axis of the torque converter being substantially horizontally disposed and also lying substantially in said vertical central longitudinal plane and aligned with said countershaft; means affording a driving connection between said countershaft and the impeller element of said torque converter; a sleeve rotatably mounted on said countershaft and operatively connected with the driven element of the torque converter; and engageable and disengageable transmission gearing on said sleeve and said axle driving shaft, said gearing being located between said torque converter and said axle, longitudinally considered; means operable to establish a direct driving connection between said power means and said axle driving shaft, and an overrunning clutch embodied in the transmission gearing which connects said sleeve and said axle driving shaft.

4. A transmission assembly adapted for operative association with the driving axle installation of a motor vehicle to provide improved balance and weight distribution, said assembly comprising, in combination, a casing through which the drive axle passes transversely; a stub power-input shaft at one end of said casing at one side of the drive axle; an axle driving shaft extending longitudinally of said casing and transversely of said drive axle and geared thereto; a direct drive clutch operatively connecting said stub shaft with said axle driving shaft; a countershaft rotatably supported in the casing; gearing operatively connecting said stub shaft with said countershaft on one side of said drive axle; said countershaft extending longitudinally of said casing and substantially parallel with said axle driving shaft and bridging said drive axle; a fluid torque converter disposed in said casing on the opposite side of said drive axle and having an impeller element operatively connected to and driven by said countershaft; a sleeve rotatably mounted on said countershaft and operatively connected with the driven element of said torque converter; a cluster of transmission gearing supported upon said sleeve and a coacting cluster of change speed gearing supported on said axle driving shaft, an overrunning clutch included in said transmission gearing, said transmission gearing being located between said drive axle and said torque converter considering the longitudinal direction of said casing; and means for alternatively connecting and disconnecting said transmission gearing and said direct drive clutch.

5. The transmission assembly as set forth in claim 4 in which a liquid-tight partition divides that portion of the casing which contains the fluid torque converter from the remainder thereof which contains the gearing and shafting, whereby the converter fluid may be maintained separate from the gearing lubricant.

JESSE G. VINCENT.

References Cited in the file of this patent

UNITED STATES PATENTS

| Number | Name | Date |
|---|---|---|
| 1,654,924 | Douglas | Jan. 3, 1928 |
| 2,057,140 | Ehrlich | Oct. 13, 1936 |
| 2,093,236 | Dodge et al. | Sept. 14, 1937 |
| 2,351,654 | Anderson | June 20, 1944 |
| 2,420,914 | Schjolin | May 20, 1947 |

FOREIGN PATENTS

| Number | Country | Date |
|---|---|---|
| 172,316 | Great Britain | Mar. 9, 1922 |